United States Patent
Sigournay

[11] 3,748,576
[45] July 24, 1973

[54] DETECTION OF PARTICLE-INCLUSIONS IN FLUID FLOW UTILIZING A DIVIDED FLUID PATH WITH A SENSING COIL ABOUT EACH PATH

[75] Inventor: Norman Lomas Sigournay, Cheltenham, England

[73] Assignee: Smiths Industries Limited, London, England

[22] Filed: Feb. 25, 1971

[21] Appl. No.: 118,887

[30] Foreign Application Priority Data
Feb. 27, 1970 Great Britain ..................... 9,492/70
Apr. 21, 1970 Great Britain ................... 19,134/70

[52] U.S. Cl. ............ 324/41, 73/432 PS, 200/61.09, 340/236, 340/270
[51] Int. Cl. ............................................. G01r 33/00
[58] Field of Search ................. 324/41, 34 F, 71 R, 324/71 PC, 61 R, 61 P; 340/270, 236; 73/432 PS; 200/61.09; 335/305

[56] References Cited
UNITED STATES PATENTS
2,237,254   4/1941   Broekhuysen ........................ 324/41
2,671,200   3/1954   Lederer ................................ 324/41
3,192,473   6/1965   Marsh ............................... 324/61 R
3,233,173   2/1966   Lees et al. ......................... 324/41 X FOREIGN PATENTS OR APPLICATIONS
1,185,898   3/1970   Great Britain .................. 324/71 CP
845,712    8/1960   Great Britain ....................... 324/41

Primary Examiner—Robert J. Corcoran
Attorney—William D. Hall, Elliott I. Pollock, Fred C. Philpitt, George Vande Sande, Charles F. Steininger and Robert R. Priddy

[57] ABSTRACT

Detector apparatus for detecting and counting particles flowing in an engine oil-return line includes two electrical coils connected in different arms of an alternating-current bridge to have opposite unbalancing effects on the bridge in response to coil-impedance changes. The coils embrace different ones of two sub-paths into which the oil flow is divided, and detection circuitry that drives a counter is connected to the bridge to sense the condition in which there is a transitory change in impedance of either coil unaccompanied by corresponding change in the other, so as thereby to discriminate against inclusions in the oil, other than particles, that divide between the two sub-paths. The detection circuitry includes filtering to eliminate counting of signals arising from vibrations and long-term unbalance of the bridge, and two further coils embracing the two sub-paths respectively may be connected in the bridge to ensure generation of bipolar signals in response to each particle. More than one counter may be driven from the detection circuitry via individual trigger circuits having different amplitude thresholds of operation so that the counters provide counts according to different particle-size categories.

13 Claims, 7 Drawing Figures

PATENTED JUL 24 1973

DETECTION OF PARTICLE-INCLUSIONS IN FLUID FLOW UTILIZING A DIVIDED FLUID PATH WITH A SENSING COIL ABOUT EACH PATH

This invention relates to detector apparatus.

The invention is concerned in particular with apparatus for the detection of particles in their passage along a defined pathway. In this respect the invention is especially, though not exclusively, concerned with the detection of metal chips or other particles, in an oil- or fuel-flow line of an engine.

Knowledge of the presence and rate of occurrence of particles in the oil-flow line of an engine provides a useful check on the health of the engine, since it is possible by this to anticipate bearing failure or other defects that warrant attention, before these defects have serious consequences. At the present time it is the practice with gas-turbine engines used on aircraft to insert magnetized plugs in the oil-return or scavenge line of the engine, and to check the accumulation of particles on these at regular intervals of engine operation. Comparison of the extent of particle accumulation with data derived empirically allows a judgement to be made of the engine health, but of course the check is by its very nature imprecise and covers only particles of ferromagnetic metals. Furthermore, the removal and study of the plugs is both time-consuming and tedious, and so there is a need for an alternative form of detection.

It is one object of the present invention to provide detector apparatus capable of detecting very small particles such as, for example, those to be found in an oil-return line of an engine.

According to one aspect of the present invention apparatus for the detection of particles in their passage along a defined pathway, comprises two electrical coils embracing different parts of the pathway, and electrical circuit means coupled to the coils to sense differentially transitory changes in the impedances of the coils.

The detector apparatus of the invention is capable of detecting ferromagnetic particles and also particles of any electrically-conductive material, whether ferromagnetic or not. Electrically-conductive particles give rise to changes in the equivalent resistances of the coils through which they pass, by virtue of the eddy-current losses produced; the changes in coil-impedances produced in this way by non-ferromagnetic particles are in general substantially smaller than those produced by otherwise-equivalent ferromagnetic particles, but the sensitivity of the differential-detection method used in the apparatus of the present invention ensures that even these changes are detectable.

The coils of the detector apparatus may be connected in an alternating-current bridge circuit. In particular they may be connected in the same sense as one another in different arms of the bridge circuit so that corresponding changes in their impedances act to unbalance the bridge circuit in opposite senses. If in these circumstances the two coils are spaced apart from one another lengthwise of the pathway a particle passing through them in turn will have a double unbalancing effect on the bridge circuit.

The pathway may be divided into parallel-connected sub-paths that are individually embraced by respective ones of the coils. The electrical circuit means is in these circumstances preferably arranged to discriminate between the condition in which a change in impedance in either one of the coils is not accompanied by a corresponding change in impedance of the other coil, and the condition in which it is. This arrangement is of especial advantage in the detection, and counting, of particles flowing in, for example, an oil-flow line of an engine. Although detector apparatus in accordance with the present invention using coils spaced apart from one another lengthwise of an undivided pathway can function very satisfactorily in detecting particles in the latter respect, there is the disadvantage that such apparatus tends to respond in the same way to slugs of dirty oil and large air bubbles. The use of a divided pathway with coils embracing the different sub-paths readily overcomes this disadvantage in that slugs of dirty oil and air bubbles can be expected to divide between the sub-paths and thereby produce corresponding changes in impedance in more than one of the coils; this is in contrast to the circumstances that apply in relation to individual particles where in general the impedance of only one coil is affected. The detector circuit can readily be arranged to discriminate between these two contrasting cases and provide detection and counting of particles in the fluid, uninfluenced to any substantial extent by other inclusions.

Where a divided pathway is used with respective coils embracing the individual sub-paths, then it may be found advantageous to arrange that each sub-path is embraced by two coils that are spaced apart from one another lengthwise of the pathway. The two coils may in each case be connected to derive signals of opposite senses in response to passage of a particle through them in turn.

Detector apparatus in accordance with the present invention will now be described, by way of example, with reference to the accompanying drawings, in which.

Figure 7:
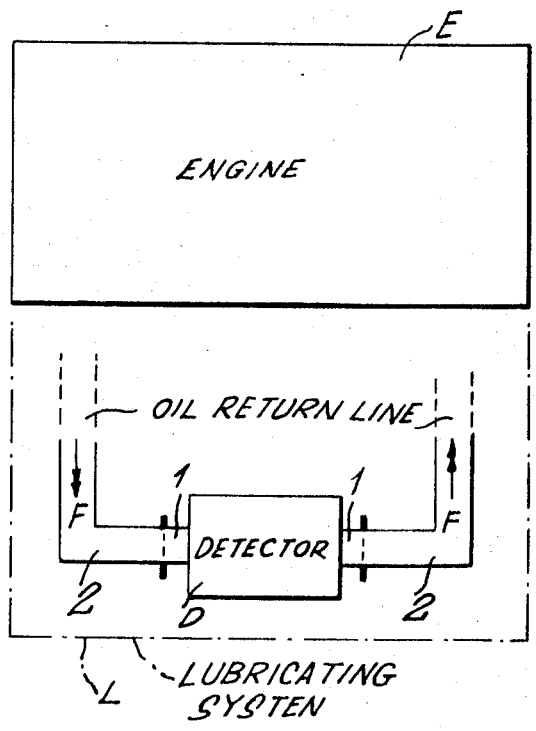
FIG. 7 is a schematic representation of an engine system incorporating the detector apparatus of FIGS. 1 to 3.

The detector apparatus D shown in FIG. 7 and to be described with reference to FIGS. 1 to 3 of the drawings, is for use in the detection and counting of metal chips or other particles, occurring in the unidirectional oil flow F along an oil-return line of the lubricating system L of a gas-turbine engine E. The same apparatus is equally applicable however to the detection and counting of such particles occurring in the fuel system of the engine.

Figure 1:
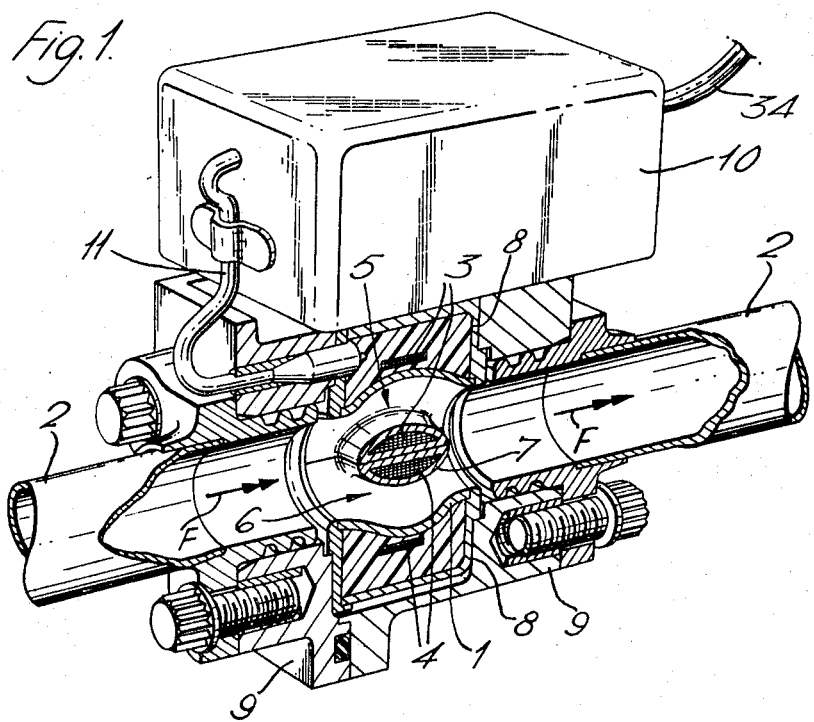
FIG. 1 is a sectional perspective view of the detector apparatus.
Figure 2:
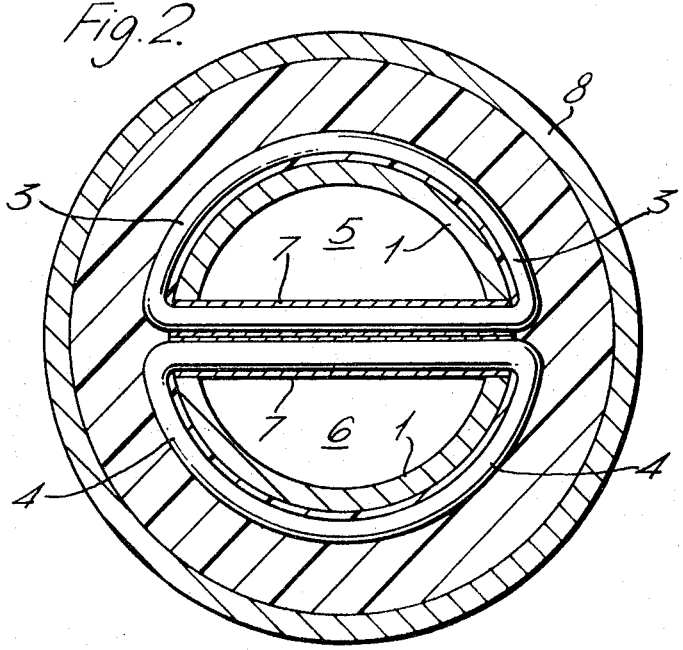
FIG. 2 is a sectional end view of a coil assembly used in the detector apparatus.

Referring more specifically to FIGS. 1 and 2, the coil assembly of the detector apparatus D includes a section of tubing 1 that is coupled in the oil-return line 2 of the lubricating system L to receive oil pumped around the system L by the engine E. The tubing 1 is of an electrically non-conductive material and carries two serially-connected electrical coils 3 and 4 that are wound to embrace respectively two parallel sub-paths 5 and 6 of equal length into which the pathway through the tubing 1 is divided by transverse ducting 7. The ducting 7 is formed of two rigid tubes (for example of stainless steel) bonded together along their length and may be shaped (as shown in FIG. 1), or provided with a suitably-profiled guard, to ensure stream-line passage of the split flow into and through the two sub-paths 5 and 6 and thence to combine for onward passage in the line 2. The coils 3 and 4, which extend through the two tubes respectively of the ducting 7 to embrace the individual sub-paths 5 and 6 at locations of substantially equal path length along the tubing 1, are totally enclosed by a copper screening-case 8 that serves to screen them electrically from influence external of the tubing 1. The case 8 is itself enclosed within a stainless-steel case 9 and the whole assembly within the case 9 is encapsulated in synthetic resin. Electrical connection of the coils 3 and 4 from the case 9 to a stainless-steel box 10 containing the major part of the circuitry of the detector apparatus, is made via a steel-encased cable 11. The circuit of the detector apparatus is shown in FIG. 3.

Figure 3:
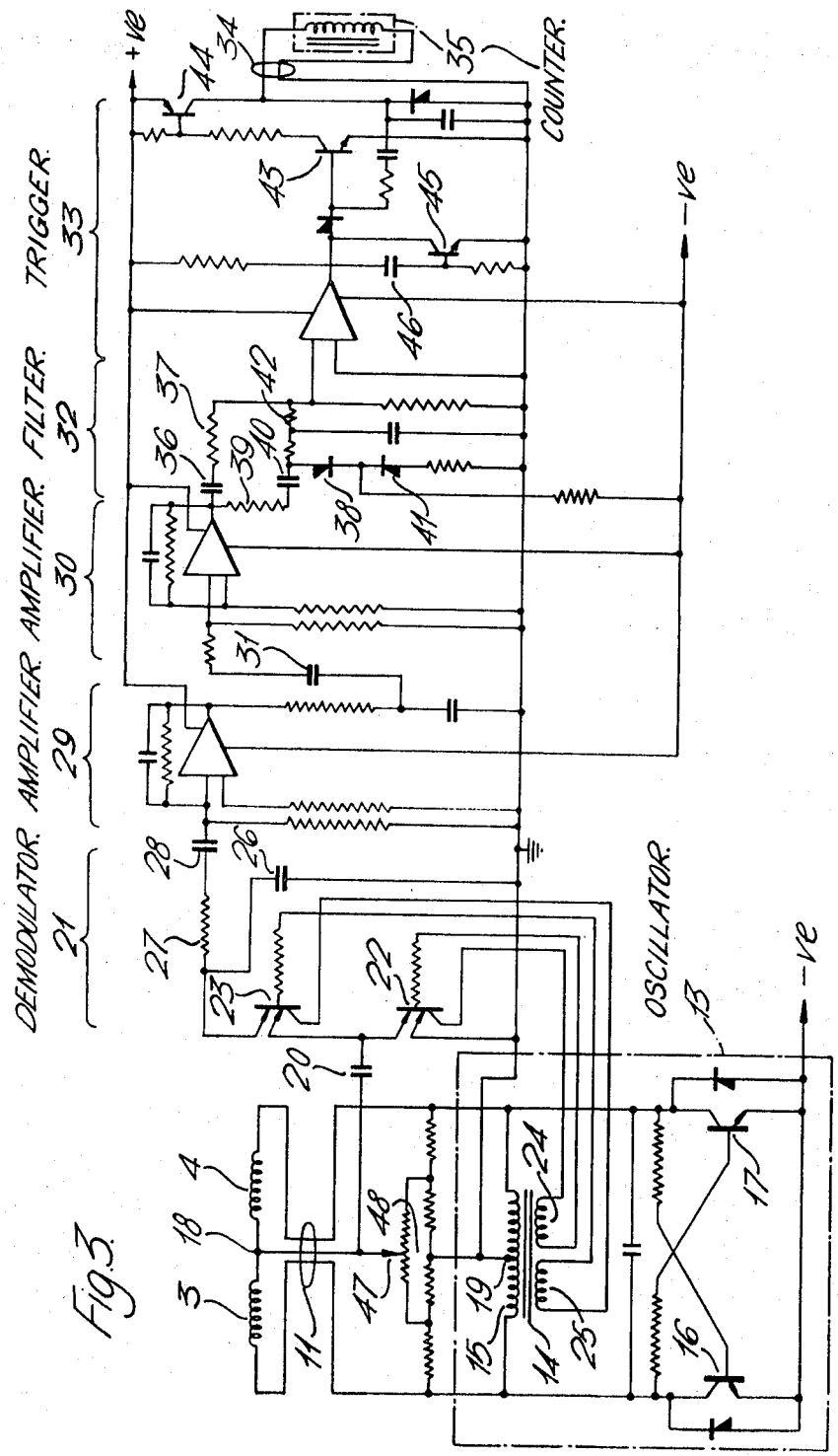
FIG. 3 is a circuit diagram of the detector apparatus.

Referring to FIG. 3, the coils 3 and 4 are connected via the cable 11 to a transistor oscillator 13 in the box 10. The oscillator 13 includes a transformer 14 having a centre-tapped primary winding 15 that is connected in the collector circuits of two cross-coupled transistors 16 and 17. The transistors 16 and 17 conduct alternately with one another to supply alternating voltage of square waveform and having a frequency of one hundred kilocycles per second, across the winding 15. The coils 3 and 4 are connected in series with one another across the winding 15 and in this way form two arms respectively of an inductive bridge circuit, with the other two arms of the bridge formed by the two halves of the winding 15. Any unbalance of the bridge circuit results in the appearance of a square-wave alternating-current signal between the junction 18 of the coils 3 and 4 and the grounded centre-tap 19 of the winding 15. This signal is supplied via a capacitor 20 to a demodulator 21.

The demodulator 21 includes two double-emitter transistors 22 and 23, and the signal supplied via the capacitor 20 is applied to a first emitter electrode of each of these. The base-collector paths of the transistors 22 and 23 are connected to respective secondary windings 24 and 25 of the transformer 15 in the oscillator 13 so that the two transistors 22 and 23 are rendered conductive alternately. The second emitter electrode of the transistor 22 is connected to ground, and the signal derived by the demodulation process to appear between the second emitter electrode of the transistor 23 and ground, is applied across a smoothing capacitor 26 and thence via a resistor 27 and capacitor 28 in series, to a high-gain amplifier 29. The output signal from the amplifier 29 is supplied to a second high-gain amplifier 30 via a capacitor 31. The resultant amplified signal is supplied via a filter 32 to a trigger circuit 33 that is connected from the box 10 via a steel-encased cable 34 to an electromechanical pulse-counter 35.

The counter 35 provides a count of the number of metal particles that pass through the tubing 1. In this respect, each such particle passes through either the sub-path 5 or the sub-path 6 and produces a transitory change in the impedance of the embracing coil 3 or 4. Only one of the coils 3 and 4 is affected and the consequent transitory unbalance of the bridge circuit causes a burst of alternating-current signal to appear between the junction 18 of the coils 3 and 4 and the centre-tap 19 of the winding 15. This signal is demodulated by the demodulator 21 to supply a pulse signal via the resistor 27 and capacitor 28 in series, to the amplifier 29. The pulse signal, as amplified by the amplifiers 29 and 30 and supplied via the filter 32 to the trigger circuit 33, causes the count of the counter 35 to be increased by unity.

Slugs of dirty oil or large air bubbles that pass along the line 2 in the oil flow F are in general divided between the two sub-paths 5 and 6. Any transitory change in impedance of either coil 3 and 4 resulting from the passage of a divided inclusion of this nature through the tubing 1, is therefore accompanied substantially simultaneously by a corresponding change in impedance of the other coil. The coils 3 and 4 are connected in the bridge circuit so that these impedance changes act in opposition to one another, and therefore do not produce any effective disturbance of the balanced condition of the bridge circuit. The changes in impedances of the two coils 3 and 4 will not necessarily be exactly equal, and so there may be a certain resultant disturbance, but this will normally be of a minor nature below the threshold of operation of the detector circuit. Any disturbance caused by small air bubbles or froth passing undivided through either path 5 and 6 is similarly of a minor nature below the operational threshold, and produces no increase in the count of the counter 35.

The count of the counter 35 accordingly provides a quantitive check on the particles that pass along the oil-line 2, and in this is not affected to any substantial degree by slugs of dirty oil and large air bubbles. This count is of assistance in determining the health of the engine, since by noting the change, or rate of change, of count that takes place through a period of engine-operation it is possible to obtain warning of incipient bearing-failure or other defects warranting withdrawal of the engine from service.

It is necessary to ensure rigidity of the electrical conductors and components of the detector apparatus in order that vibrations or other forces experienced during operation do not produce changes in capacitance or other electrical parameters that would adversely affect the functioning of the apparatus. The detection of particles is based on the sensing of small signals that are generated from the electrical losses or inductance-changes brought about by the passage of those particles through the coils 3 and 4, and so if erroneous detection and counting is to be avoided, care needs to be taken to eliminate as far as possible the introduction of extraneous electrical noise into the circuitry. The effects of electrical noise may, however, be reduced by arranging that the detector circuit is selective of the signal frequencies that are likely to arise from particles in the circumstances under consideration. For example, in one practical application of the detector circuit where the operational range of fluid flow-rate is from 2 to 30 feet per second and the path length within the tubing 1 throughout which the presence of a particle is of significant influence on the circuit is about ½ inch, the minimum signal frequency to be detected can be taken as 40 cycles per second and the maximum as 720 cycles per second. In these particular circumstances therefore, the likelihood of error arising from electrical noise can be reduced by arranging that the amplifiers 29 and 30 provide a frequency characteristic that discriminates against disturbances arising outside the frequency band of 40 to 720 cycles per second.

Noise components that arise from engine vibrations and lie within or close to the pass-band of the amplifiers 29 and 30, act to produce a steady train of pulse signals from the amplifier 30; it is the purpose of the filter 32 to avoid detection and counting of such signals. To this end the filter 32 provides two signal paths from the output of the amplifier 30, the main one via a capacitor 36 and a resistor 37 in series, to the trigger circuit 33, and the other to a rectifier 38 via a resistor 39 and capacitor 40 in series. The rectifier 38 provides rectification against a negative bias established by conduction of a second rectifier 41, and in the case where there is a steady train of output signals from the amplifier 30 there is in this way established a direct-current level which as applied via a resistor 42 depresses the main-path signals below the threshold of the trigger circuit 33. There is therefore no response of the trigger circuit 33 to the steady train of noise signals. Signals arising, in normal circumstances irregularly, from the passage of particles along the tubing 1, however, produce excursions above the established direct-current level so as to exceed the threshold of the trigger circuit 33 and thereby produce the desired increase in count of the counter 35.

The trigger circuit 33 is of a generally conventional form and in this respect includes a monostable circuit provided by two transistors 43 and 44 for supplying an operating pulse to the counter 35 in response to each pulse signal received from the filter 32. The circuit 33, however, includes an additional transistor 45 that serves to introduce delay into initial operation of the monostable circuit when power supply to the detector apparatus is switched on. The transistor 45 conducts to short out input to the monostable circuit until a capacitor 46 has charged, and in this way avoids the possibility of false counts being accumulated in respect of initial switching-transients in the circuit.

The inter-stage capacitors 28 and 31 block direct-current components appearing in the circuit and ensure that these are ineffective to contribute to the count. Correction for any standing out-of-balance of the bridge circuit is made by adjustment of the setting of a tap 47 on a potentiometer chain 48 connected across the winding 15.

It has been found with a circuit constructed as shown in FIG. 3, that very small metallic particles can be detected in the oil-flow. In particular, spherically-shaped particles having a diameter as little as 0.05 millimeters can be detected and counted. The apparatus detects particles of electrically-conductive material as well as those of magnetic (whether magnetized or just magnetizable material, such particles in general producing a phase shift in the bridge circuit that, together with any associated amplitude change, is readily detected by the arrangement described. The shift is brought about by virtue of the change in energy-loss in the revelant coil 3 or 4 (that is to say, a change in the equivalent resistance of the coil), together with a change in inductance where the particle involved is ferromagnetic.

Figure 4:
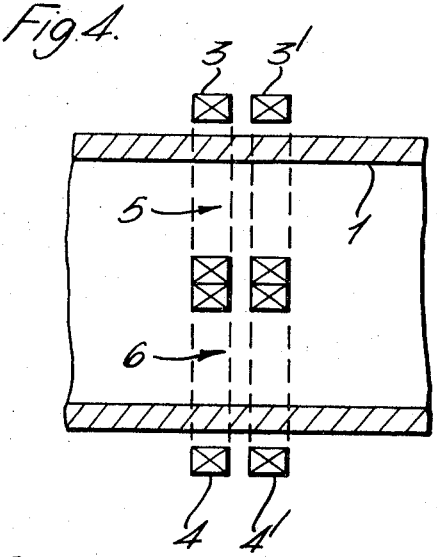
FIGS. 4 to 6 are diagrams that serve to illustrate possible modifications of the detector apparatus of FIGS. 1 to 3.
Figure 5:
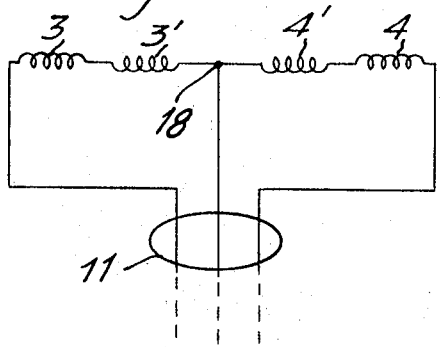

Although passage of a particle through the tubing 1 produces substantially the same result irrespective of whether that particle passes through sub-path 5 or sub-path 6, the circuit of FIG. 3 tends to be more sensitive to passage through one rather than the other. This arises from the fact that the trigger circuit 33 responds to positive-going voltage excursions, and such excursions tend to be more pronounced when originating from signals induced in one of the two coils 3 and 4 rather than from signals (of the opposite polarity) induced in the other coil. Any difficulty arising from this asummetry may be overcome using the modification illustrated in FIGS. 4 and 5. With this, two coils 3' and 4', which are exactly the same as the coils 3 and 4 and embrace the sub-paths 5 and 6 respectively, are positioned as shown in FIG. 4 a short distance (for example ½ inch) downstream from the set of coils 3 and 4 on the tubing 1. Each coil 3' and 4' is connected as shown in FIG. 5 in the same arm of the bridge circuit as its corresponding coil 3 and 4, but in the opposite sense. In this way two distinct pulses of opposite polarity always arise from each particle irrespective of whether the particle passes through the sub-path 5 or sub-path 6; this ensures that irrespective of the sub-path 5 or 6 concerned there is always a pronounced positive-going pulse to trigger the circuit 33 and operate the counter 35.

Figure 6:
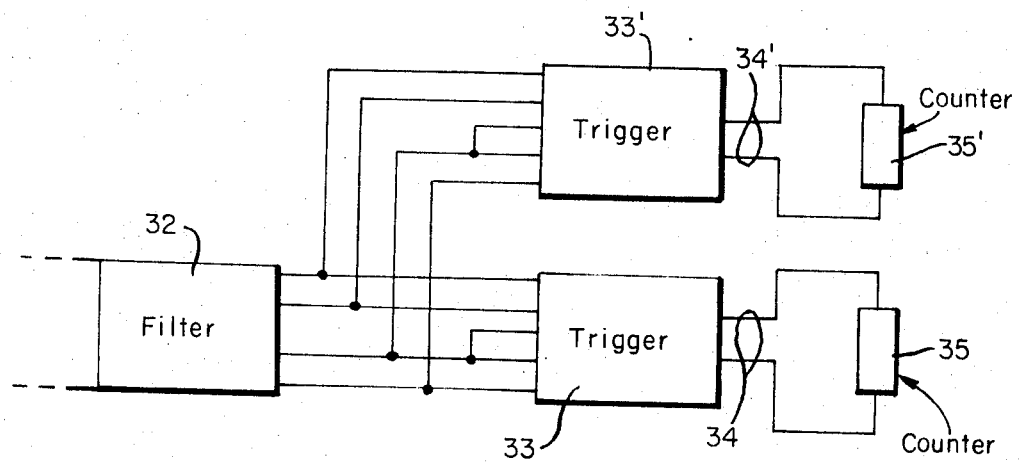

The count provided by the counter 35 represents the number of particles detected without specific indication of their size. Where it is desired to provide some differentiation between the counter particles on the basis of size (or more particularly on the basis of the relative disturbance they cause in the detector coils 3 and 4) it is possible to do this easily by the addition of one or more further trigger circuits identical to the trigger circuit 33 and driving individual counters corresponding to the counter 35 As illustrated in FIG. 6, each. Each such further circuit 33 may be coupled to receive the pulse-signals supplied by the filter 32 of the circuit of FIG. 3, and may be set to discriminate against those signals representing particles up to a predetermined threshold size. The count provided by the counter 35' driven via a cable 34' from the circuit 33', accordingly gives due indication of the number of counted particles above this particular threshold. Thus, the counters 35 and 35', driven respectively by the trigger circuits 33 and 33' operating to different thresholds, provide counts according to different particle-size categorizations.

With the arrangement described with reference to FIG. 3, demodulation is effected using components of the basic energizing signal that are nominally in-phase and anti-phase with this signal as generated by the oscillator 13. It may be found preferable in certain circumstances, to use components that, whilst in anti-phase with one another, are in phase quadrature with the generated signal.

The tubing 1 may be formed of a ceramic and may be provided with an internal lining of polytetrafluorethylene. Alternatively, however, the tubing 1 may be formed of glass, or of a glass-ceramic material.

I claim:

1. Flow-apparatus comprising means defining a flow pathway, means for supplying matter to flow in a unidirectional stream along said pathway, and apparatus for the detection of particles in said stream during their passage along said pathway, said detection apparatus comprising means defining a junction point in said pathway, means dividing the pathway at said junction point into two parallel-connected sub-paths extending downstream from said point, first and second electrical coils, means mounting the first of said coils to embrace a first of the two sub-paths at a predetermined distance downstream from said junction point, means mounting the second of said coils to embrace the second of the two sub-paths at a distance downstream from said junction point substantially equal to said predetermined distance so that the effective path-length for passage along said pathway to said second coil is the same as that for passage to said first coil, and electrical circuit means coupled to the two coils to sense differentially transistory changes in the impedances of the coils.

2. Appaatus according to claim 1 wherein the said electrical circuit means comprises an electrical alternating-current bridge circuit, means connecting the two coils in the bridge circuit, the coils being connected in the bridge circuit to unbalance it in the event of change in impedance of one coil unaccompanied by a corresponding change in impedance of the other coil, and means for detecting transitory unbalance of the bridge circuit.

3. Apparatus according to claim 2 including means coupled to said circuit means to provide a measure of the number of occasions on which the bridge circuit is unbalanced transitorily.

4. Fluid-flow apparatus comprising a pathway for fluid, means to supply fluid to flow in a unidirectional stream along said pathway, and detector means for the detection of particles in said fluid during their passage along said pathway, said detector means comprising means defining a junction point in said pathway, means dividing the pathway at said junction point into a plurality of parallel-connected sub-paths extending downstream from said point, said sub-paths being of substantially equal length to one another, a plurality of electrical coils, means mounting the coils to embrace the sub-paths at positions of substantially equal distance to one another downstream from said point in said pathway, each said coil embracing a different one of said sub-paths from any other of said coils, and electrical circuit means coupled to the coils to sense transitory changes in their impedances, said circuit means including means to discriminate between a first condition in which there is a transitory change in impedance of only one of the coils, and a second condition in which there is a transitory change substantially simultaneously in the impedance of more than one said coil.

5. Apparatus according to claim 4 including means coupled to said circuit means to provide a measure of the number of occasions on which said first condition exists.

6. Apparatus according to claim 4 wherein said circuit means includes an alternating-current bridge circuit, connection means coupling the coils in the bridge circuit, the coils being coupled in the bridge circuit by said connection means to provide transitory unbalance of the bridge circuit upon each occurrence of said first condition and to retain the bridge circuit substantially balanced upon each occurrence of said second condition, and output means responsive to transitory unbalance of the bridge circuit.

7. Apparatus according to claim 6 wherein said output means comprises signal-supply means for supplying a signal in accordance with each transitory unbalance of the bridge circuit, signal-counting means for counting signals supplied thereto from the signal-supply means, and a signal channel for transmitting signals supplied by said signal-supply means to said signal-counting means, said channel including means to restrict the signals transmitted to said signal-counting means to those occurring within a predetermined frequency band.

8. Apparatus comprising a fluid-flow line, fluid-supply means for supplying fluid to flow in a unidirectional stream in said fluid-flow line, and detector means for the detection of particles flowing in said fluid-flow line, said detector means comprising tubing of electrically non-conductive material coupled in the fluid-flow line, means dividing the tubing into two parallel-connected sub-paths, first and second electrical coils, means mounting the said first coil to embrace a first of the two sub-paths, means mounting the said second coil to embrace the second of the two sub-paths at an effective distance downstream from said fluid-supply means substantially equal to the effective downstream distance of said first coil from said fluid-supply means, and electrical circuit means coupled to both of said first and second coils to sense transitory changes in their impedances, said circuit means including means to sense the condition in which there is a transitory change in impedance of either of the first and second coils unaccompanied substantially simultaneously by a corresponding transitory change in impedance of the other coil.

9. Apparatus according to claim 8 including means to provide a measure of the number of occasions on which said condition is sensed by the said circuit means.

10. Apparatus for the detection of particles in their passage along a defined pathway, comprising means dividing the pathway into two parallel-connected sub-paths, a first electrical coil embracing a first of the said sub-paths, a second electrical coil embracing the second of said sub-paths, electrical circuit means coupled to both said first and second coils to sense differentially transitory changes in the impedances of the coils, a third electrical coil embracing the said first sub-path at a position spaced lengthwise of the pathway from said first coil, means coupling the said third coil in said circuit means in opposite sense to said first coil, a fourth electrical coil embracing the said second sub-path at a position spaced lengthwise of the pathway from said second coil, and means coupling the said fourth coil in said circuit means in opposite sense to the said second coil.

11. Apparatus for the detection of particles in their passage along a defined pathway comprising means dividing the pathway into a plurality of parallel-connected sub-paths, a plurality of electrical coils embracing the sub-paths, each said coil embracing a different one of the said paths from any other of said coils and electrical circuit means coupled to the coils to sense transitory changes in their impedances, said circuit means including an alternating-current bridge circuit, connection means coupling the coils in the bridge circuit, the coils being coupled in the bridge circuit by said connection means to provide transitory unbalance of the bridge circuit upon each occurrence of a first condition in which there is a transitory change in impedance of only one of the coils, and to retain the bridge circuit substantially balanced upon each occurrence of a second condition in which there is a transitory change in the impedance of more than one coil, and output means which is responsive to transitory unbalance of the bridge circuit and which comprises signal-supply means for supplying a signal in accordance with each transitory unbalance of the bridge circuit, signal-counting means for counting signals supplied thereto from the signal-supply means, and a signal channel for transmitting signals supplied by said signal-supply means to said signal-counting means, said channel including means to restrict the signals transmitted to said signal-counting means to those occurring within a predetermined frequency band, and means to suppress from the signals transmitted to said signal-counting means regularly-recurrent signals within said frequency band.

12. Apparatus for the detection of particles in their passage along a defined pathway comprising: means dividing the pathway into a plurality of parallel-connected subpaths; a plurality of pairs of electrical coils embracing the sub-paths, each said pair of coils comprising a first electrical coil that embraces a different one of said sub-paths from the first coil of any other of said coil pairs, and a second electrical coil that embraces the same one of said sub-paths as the first coil of the pair; and electrical circuit means coupled to said first coils of said coil pairs to sense transitory changes in their impedances, said circuit means including an alternating-current bridge circuit, connection means coupling the said first coils in the bridge circuit, the said first coils being coupled in the bridge circuit by said connection means to provide transitory unbalance of the bridge circuit upon each occurrence of a first condition in which there is a transitory change in impedance of only one of the said first coils, and to retain the bridge circuit substantially balanced upon each occurrence of a second condition in which there is a transitory change in the impedance of more than one of said first coils output means responsive to transitory unbalance of the bridge circuit, and further connection means coupling the said second coils of said coil pairs in the bridge circuit to provide transitory unbalance of the bridge circuit upon each occurrence of the condition in which there is a transitory change in impedance of only one of the said second coils, each said second coil being coupled in said bridge circuit in series with the said first coil with which it is paired in said coil pairs.

13. In a fluid-flow system, a fluid-flow line, means for supplying fluid to flow in one direction along said line, and apparatus for detecting particles passing along said fluid-flow line in the fluid stream and for categorizing the detected particles on the basis of a predetermined particle-property, said detecting apparatus comprising: means defining a junction point in said pathway; means dividing the pathway at said junction point into two parallel-connected sub-paths extending downstream from said point; two electrical coils embracing different ones of the sub-paths at substantially equal distances to one another downstream from said junction point; electrical circuit means coupled to the coils to sense differentially transitory changes in the impedances of the coils resulting from the passage of successive particles along said fluid-flow line, the sensed differential impedance-changes varying in magnitude in accordance with variation in the magnitude of said property from one to another of the successive particles, and said circuit means including signal-deriving means for deriving signals dependent in amplitude upon the magnitudes of the sensed differential impedance-changes; and a plurality of output means coupled to said circuit means to receive said signals derived by said signal-deriving means, each said output means being operative to respond to only those of said derived signals that have an amplitude exceeding a predetermined threshold level to provide an output representation dependent on the number of such signals received from the said signal deriving means, and wherein different ones of said output means are operative to different threshold levels from one another so that their output representations are dependent on the numbers of particles passing along said fluid-flow line, according to respective categorizations based on said property.

* * * * *